US006536828B2

(12) United States Patent
Love et al.

(10) Patent No.: US 6,536,828 B2
(45) Date of Patent: Mar. 25, 2003

(54) SOLAR WINDSHIELD SYSTEM

(76) Inventors: Ernest R. Love, 4464 Agua Vista, Union City, CA (US) 94587; Brenda J. Love, 4464 Agua Vista, Union City, CA (US) 94587

( * ) Notice: Subject to any disclaimer, the term of this patent is extended or adjusted under 35 U.S.C. 154(b) by 0 days.

(21) Appl. No.: 09/875,897

(22) Filed: Jun. 8, 2001

(65) Prior Publication Data

US 2002/0185883 A1 Dec. 12, 2002

(51) Int. Cl.$^{7}$ ................................ B60J 1/02; B60J 3/04
(52) U.S. Cl. .................... 296/96.19; 296/97.2; 359/601
(58) Field of Search ............................ 296/84.1, 96.19, 296/97.2, 97.7, 146.15; 359/265, 275, 601

(56) References Cited

U.S. PATENT DOCUMENTS 4,217,391 A * 8/1980 Kaltz ..................... 296/215 X
4,641,922 A * 2/1987 Jacob
4,893,908 A * 1/1990 Wolf et al.
5,228,925 A * 7/1993 Nath et al. .............. 296/215 X
5,239,406 A * 8/1993 Lynam ................ 296/96.19 X
5,390,045 A * 2/1995 Bernard, Jr.
5,472,643 A * 12/1995 Varaprasad et al.
5,602,457 A * 2/1997 Anderson et al. ...... 296/84.1 X
5,781,343 A * 7/1998 Cook
5,803,534 A * 9/1998 Murkett et al.
5,940,216 A * 8/1999 Gibbs
6,039,390 A * 3/2000 Agrawal et al. ............ 296/211

* cited by examiner

*Primary Examiner*—Joseph D. Pape
(74) *Attorney, Agent, or Firm*—Peter A. Borsari

(57) ABSTRACT

A vehicle solar windshield system comprising a front windshield composed of a first transition lens material, at least one side window composed of a second transition lens material and a rear windshield composed of a third transition lens material. In one embodiment, the first transition lens material has a first darkening strength, the second lens material has a second darkening strength which is greater than the first darkening strength and the third lens material has a third darkening strength which is greater than the second darkening strength. In a preferred embodiment, the transitional lens material is a photochromic lens material.

17 Claims, 1 Drawing Sheet

TL4 20 TL2 10
TL3
30
40 20 TL2 TL1

FIG. 1
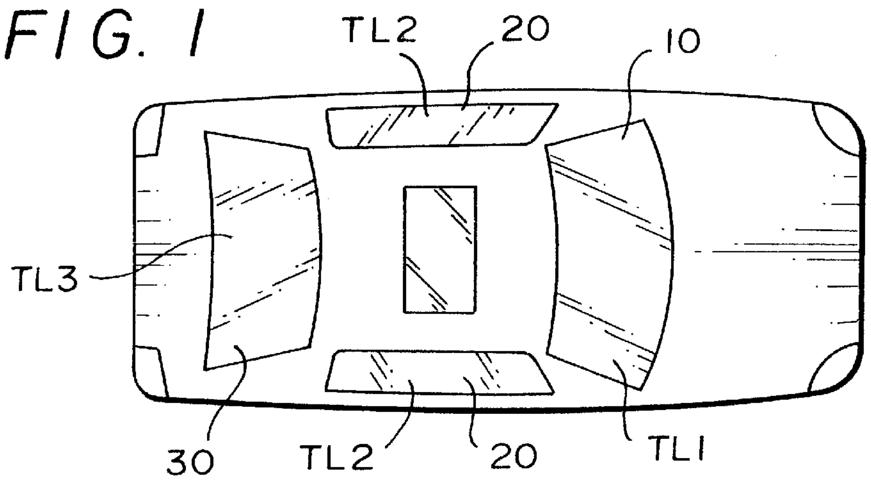
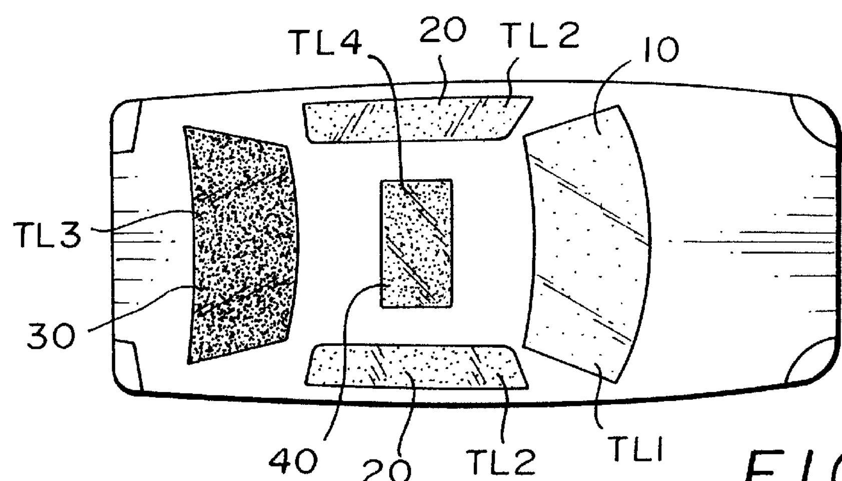
FIG. 2
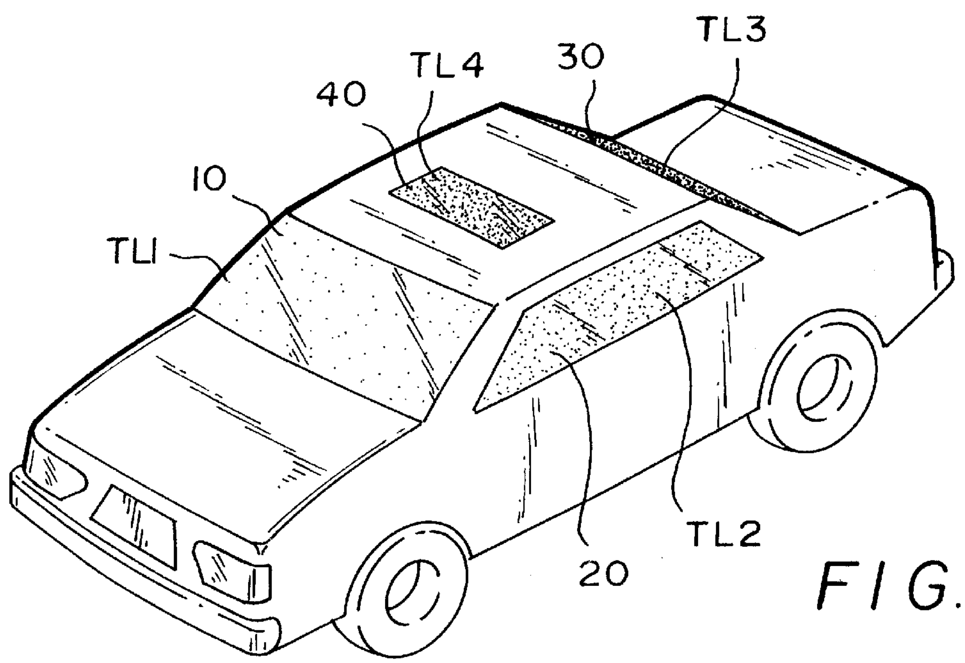
FIG. 3

SOLAR WINDSHIELD SYSTEM

FIELD OF INVENTION

The present invention relates to a solar windshield system comprising three transition lens materials, each transition lens material having a particular darkening strength when exposed to ultraviolet light. More particularly, the present invention relates to a solar windshield system for a vehicle, such as an automobile, having a front windshield composed of a first transition lens material, at least one side window composed of a second transition lens material and a rear windshield composed of a third transition lens material.

BACKGROUND OF THE INVENTION

Windshield systems for vehicles have undergone numerous modifications throughout the years in order to facilitate driving under various conditions. Reducing the transmission of visible light is one such modification. Many attempts have been made in the prior art to reduce glare, transmission of ultraviolet (UV) light and infrared (IR) light. One type of modification is to tint or glaze the windshield with a compound or film which permanently darkens the windshield. However, a permanent darkening of the windshield hinders driving, particularly at night or during very cloudy and stormy conditions. Another type of "tinting" modification is to darken only a portion of the windshield, such as the uppermost portion of the windshield or the periphery of the windshield. For example, U.S. Pat. No. 4,874,654 to Funaki et al., issued Oct. 17, 1989, teaches a vehicle window glass composed of a transparent part and a colored part formed on the periphery of the transparent part. However, an inherent drawback to Funaki et al. is that part of the windshield is permanently darkened while another part is permanently untreated; the untreated portion still being fully exposed to UV and IR light.

Another modification to vehicle windshields is providing a laminated windshield having one layer that is reactive to UV light. For instance, U.S. Pat. No. 4,973,511 to Farmer et al., issued Nov. 27, 1990, provides a laminated window construction comprising a solar control film formed by a flexible plastic substrate having on one surface a multilayer solar coating which provides about 70% normal visible light transmissibility. A drawback to the Farmer et al. window assembly is that the coating provides a permanently 70% transmissibility, even under night time conditions. U.S. Pat. No. 5,956,175 to Hojnowski, issued Sep. 21, 1999, teaches a solar control window film which having high visible light transmission and low transmission of near infrared heat energy. Hojnowski provides a multilayer window having one or more layers which absorb near infrared light and at least one window film having a visible light transmission of about 50 to 80%. However, the window film permanently reduces visible light transmission.

The use of a transition lens material in glasses and windows has been explored. Typically, a transition glass contains millions of photochromic molecules which absorb UV light. When exposed to sunlight (i.e. UV rays), a chemical reaction occurs which transforms the photochromic molecules into colored light absorbers. In other words, exposure to sunlight will activate the photochromic molecules, thereby darkening a transition glass. The absence of sunlight will deactivate the photochromic molecules and the transition glass will revert to its clear state. The degree of darkening, or darkening strength, will depend upon the amount of photochromic material within the transition glass and the intensity of the UV light. Glass photochromic lenses have been available since the 1960's and plastic photochromic lenses were introduced in the early 1990's. A conventional glass photochromic lens is the PHOTOGRAY EXTRA™, available from Corning Glass Works, which darkens to 22% transmission in sunlight. Another typical photochromic lens is the PHOTOBROWN EXTRA™, also available from Corning Glass Works.

Examples of windows and vehicle windshields having a photochromic component are known in the art. For instance, U.S. Pat. No. 3,964,823 to Trozollo, issued Jun. 22, 1976, the disclosure of which is incorporated by reference, and U.S. Pat. No. 3,984,177 to Trozzolo, issued Oct. 5, 1976, broadly teach the use of a certain class of photochromic materials in articles such as windshields and glass panes and sunglasses. U.S. Pat. No. 5,390,045 to Bernard, Jr., issued Feb. 14, 1995, teaches an adjustable window tinting system for limiting passage of both visible light and radiative heat, using a glass assembly comprising a photochromatic glass, an electrochromatic glass and a pair of spaced glass pane filled with a tinted fluid. U.S. Pat. No. 6,039,390 to Agrawal et al., issued Mar. 21, 2000, discloses a chromogenic window assembly panel which is composed of several panels, one of which may be a photochromic panel. U.S. Pat. No. 6,094,290 to Crawford et al., issued Jul. 25, 2000, provides a light-reactive thermal window having external and internal panes, the external pane being composed of a photochromic lens material. However, each of these windshield assemblies discloses a construction which is complicated and typically comprising multiple layers.

Although there have been advances in the art with respect to glass assemblies having a photochromic material for utilization as a front windshield, none of prior art discloses or suggests a solar windshield system composed of transition lens materials of varying degrees of darkening strength for use in a vehicles front windshield, rear windshield and side windows. Accordingly, a need still exists for a solar windshield system which utilizes multiple transition lens materials. Such a solar windshield system should provide a first transition lens material having a first darkening strength, a second transition lens material having a second darkening strength which is greater than the first darkening strength and a third transition lens material having a third darkening strength which is greater than the second darkening strength. Such a solar windshield system should utilize the first transition lens material for the front windshield, the second transition lens material for the side windows and the third transition lens material for the rear windshield. Such as solar windshield system should be simple and effective to use and should darken or lighten depending on the degree of exposure to the sun. In addition, such a solar windshield system also should facilitate driving a vehicle when the sunlight is strong and should not diminish driving during the night or at other times when the sunlight is weak. Moreover, such a system should also prevent the interior of a vehicle from becoming heated when exposed to strong sunlight, as well as preserving the vehicle's interior from damage.

SUMMARY OF THE INVENTION

Accordingly, it is an object of the present invention to provide a solar windshield system comprising a first transition lens material having a first darkening strength, a second transition lens material having a second darkening strength which is greater than the first darkening strength an a third transition lens material having a third darkening strength which is greater than the second darkening strength.

It is also an object of the present invention to provide a solar windshield system for a vehicle comprising a front windshield composed of a first transition lens material having a first darkening strength, at least one side window composed of a second transition lens material having a second darkening strength which is greater than the first darkening strength, and a rear windshield composed of a third transition lens material having a third darkening strength which is greater than the second darkening strength.

It is another object of the present invention to provide a solar windshield system wherein the first, second and third transition lens materials are photochromic lens materials.

It is an additional object of the present invention to provide a solar windshield system which is simple and effective to use and which darkens or lightens depending upon the exposure of sunlight.

It is yet another object of the present invention to provide a solar windshield system which facilitates driving a vehicle when the sunlight is strong and which does not diminish driving during the night or at other times when the sunlight is weak.

It is still another object of the present invention to provide a solar windshield system which prevents the interior of a vehicle from becoming heated and/or damaged when exposed to strong sunlight.

Additional objects, advantages and novel features of the invention will be set forth in part of the description and claims which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, wherein:

FIG. 1 is a top view of a vehicle having the solar windshield system of the present invention.

FIG. 2 is a top view of a vehicle having the solar windshield system of the present invention after exposure to sunlight.

FIG. 3 is a top perspective view of a vehicle having the solar windshield system of the present invention after exposure to sunlight.

DETAILED DESCRIPTION

The present invention relates to a solar windshield system comprising three transition lens materials, each transition lens material having a particular darkening strength when exposed to ultraviolet light, such as the exposure to the sun. More particularly, the present invention relates to a solar windshield system for a vehicle comprising a first transition lens material TL1 having a first darkening strength when exposed to ultraviolet light, a second transition lens material TL2 having a second darkening strength when exposed to ultraviolet light, and a third transition lens material TL3 having a third darkening strength when exposed to ultraviolet light. Preferably, the third darkening strength TL3 is greater than the second darkening strength TL2 and the second darkening strength is greater than the first darkening strength TL1. It is to be understood that throughout this application, the term "darkening strength" refers to the degree of darkening which the transition lens material undergoes.

It is contemplated that the solar windshield system of the present invention is to be utilized with a vehicle, such as an automobile. Accordingly, referring to FIGS. 1, 2 and 3, a vehicle is shown comprising a front windshield 10, at least one side window 20 and a rear windshield 30. Front windshield 10 is composed of the first transition lens material TL1 having a first darkening strength. Preferably, the first transition lens material has a darkening strength of about 10 to about 35 percent when exposed to ultraviolet light. More preferably, the first transition lens material has a darkening strength of about 20 to about 30 percent when exposed to ultraviolet light. Most preferably, the first transition lens material has a darkening strength of about 30 percent. In other words, most preferably, the first transition lens darkens to about 30 percent transmission when exposed to sunlight.

The at least one side window 20 is composed of the second transition lens material TL2 having a second darkening strength. Preferably, the second transition lens material has a darkening strength of about 25 to about 55 percent when exposed to ultraviolet light. More preferably, the second transition lens material has a darkening strength of about 35 to about 50 percent when exposed to ultraviolet light. Most preferably, the second transition lens material has a darkening strength of about 50 percent. In other words, most preferably, the second transition lens darkens to about 50 percent transmission when exposed to sunlight.

Rear windshield 30 is composed of the third transition lens material TL3 having a third darkening strength. Preferably, the third transition lens material has a darkening strength of about 45 to about 97 percent when exposed to ultraviolet light. More preferably, the third transition lens material has a darkening strength of about 65 to about 97 percent when exposed to ultraviolet light. Most preferably, the third transition lens material has a darkening strength of about 97 percent. In other words, most preferably, the third transition lens darkens to about 97 percent transmission when exposed to sunlight.

In the Figures, the vehicle comprises a front windshield 10 composed of a first transition lens TL1, two side windows 20 each composed of a second transition lens material TL2 and a rear windshield 30 composed of a third transition lens material TL3. Referring particularly to FIG. 1, when there is no exposure to ultraviolet light, the front windshield, side windows and rear windshield are illustrated as being clear, as there has been no darkening of the three transition lens materials. FIGS. 2 and 3 show the vehicle during exposure to ultraviolet light. Upon exposure to ultraviolet light, the three transition lens materials darken is response to the UV light. As the three transition lens materials have differing darkening strengths, the front and rear windshields and side windows darken to a different degrees. Thus, in the preferred embodiment, front windshield 10, composed of the first transition lens material TL1, darkens to about 30 percent, the side windows 20, composed of the second transition lens material TL2, darken to about 50 percent and the rear windshield 30, composed of the third transition lens material TL3, darkens to about 97 percent.

Any transition lens material which is capable of darkening upon exposure to sunlight (UV light) and which is capable of becoming clear in the absence of ultraviolet light can be utilized in the solar windshield system of the present invention. Suitable transition lens materials include, for example, electrochromatic and photochromic lens materials. Preferably, the transition lens material is a photochromic lens material. Commercial photochromic lens material which are suitable for use in the present invention include, for example, PHOTOGRAY EXTRA™, PHOTOBROWN EXTRA™, PHOTOGRAY II™, and PHOTOSUN™, all available from Corning Glass Works. However, it is to be understood that the present invention is not limited to these photochromic lens materials and any transition lens material having the ability to darken upon exposure to sunlight and clear in the absence thereof can be used. In addition, when utilized for vehicular windows, the transition lens material should meet all federal guidelines and regulations regarding manufacture and safety concerns.

Optionally, the solar windshield system of the present invention can be applied to a sun/moon roof 40 as shown in the Figures. The sun/moon roof 40 can be composed of one of the three transition lens materials TL1, TL2, TL3, or can be composed of a fourth transition lens material TL4. Preferably, the sun/moon roof 40 is composed of a transition lens material TL4 having a darkening strength less than the darkening strength of the third transition lens material.

In operation, a vehicle is provided with the inventive solar windshield system comprising a front windshield 10 composed of the first transition lens material TL1, side windows composed of the second transition lens material TL2 and a rear windshield composed of the third transition lens material TL3. The different darkening strengths of the three transition lens material will facilitate driving the vehicle under varying driving conditions. For example, when the vehicle is driven under a cloudless sky, that is when sunlight exposure is maximized, the transition lens materials TL1, TL2, TL3 will respond to the ultraviolet light and darken to the maximum potential. However, as the front windshield is composed of the weakest transition lens material, the front windshield will darken sufficiently to reduce glare but will not hinder the driver's visibility. The side windows and rear windshield will darken to a greater extent than the front windshield. This darkening effect will keep the interior of the car cooler and prevent damage to the interior of the car from the sunlight. When the vehicle is exposed to moderate sunlight, for example, when the vehicle is driven on a cloudy day, the three transition lens materials will respond to the available ultraviolet light and darken but not to the maximum potential. Of course, when the vehicle is operated at night time or under conditions with minimal sunlight exposure, the windshields and windows will appear clear or only darken slightly.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A solar windshield system for a vehicle having a front windshield, a rear windshield and at least one side window comprising:

(a) a first transition lens material having a first darkening strength when exposed to ultraviolet light;

(b) a second transition lens material having a second darkening strength when exposed to ultraviolet light, said second darkening strength being greater than said first darkening strength, and (c) a third transition lens material having a third darkening strength when exposed to ultraviolet light, said third darkening strength being greater than said second darkening strength.

2. The solar windshield in accordance with claim 1, wherein (a) said first transition lens material has a darkening strength of about 10 to about 35 percent when exposed to ultraviolet light;

(b) said second transition lens material has a darkening strength of about 25 to about 55 percent when exposed to ultraviolet light, and (c) said third transition lens material has a darkening strength of about 45 to about 97 percent when exposed to ultraviolet light.

3. The solar windshield system in accordance with claim 2, wherein (a) said first transition lens material has a darkening strength of about 20 to about 30 percent when exposed to ultraviolet light;

(b) said second transition lens material has a darkening strength of about 35 to about 50 percent when exposed to ultraviolet light, and (c) said third transition lens material has a darkening strength of about 65 to about 97 percent when exposed to ultraviolet light.

4. The solar windshield system in accordance with claim 2, wherein (a) said first transition lens material has a darkening strength of about 30 percent when exposed to ultraviolet light;

(b) said second transition lens material has a darkening strength of about 50 percent when exposed to ultraviolet light, and (c) said third transition lens material has a darkening strength of about 97 percent when exposed to ultraviolet light.

5. The solar windshield system in accordance with claim 1, wherein (a) said front windshield is composed of said first transition lens material;

(b) said at least one side window is composed of said second transition lens material, and (c) said rear windshield is composed of said third transition lens material.

6. The solar windshield in accordance with claim 5, wherein (a) said first transition lens material has a darkening strength of about 10 to about 35 percent when exposed to ultraviolet light;

(b) said second transition lens material has a darkening strength of about 25 to about 55 percent when exposed to ultraviolet light, and (c) said third transition lens material has a darkening strength of about 45 to about 97 percent when exposed to ultraviolet light.

7. The solar windshield system in accordance with claim 6, wherein (a) said first transition lens material has a darkening strength of about 20 to about 30 percent when exposed to ultraviolet light;

(b) said second transition lens material has a darkening strength of about 35 to about 50 percent when exposed to ultraviolet light, and (c) said third transition lens material has a darkening strength of about 65 to about 97 percent when exposed to ultraviolet light.

8. The solar windshield system in accordance with claim 6, wherein (a) said first transition lens material has a darkening strength of about 30 percent when exposed to ultraviolet light;

(b) said second transition lens material has a darkening strength of about 50 percent when exposed to ultraviolet light, and (c) said third transition lens material has a darkening strength of about 97 percent when exposed to ultraviolet light.

9. The solar windshield system in accordance with claim 5, further comprising a fourth transition lens material having a fourth darkening strength when exposed to ultraviolet light.

10. The solar windshield system in accordance with claim 9, wherein said vehicle further comprises a sun/moon roof composed of said fourth transition lens material.

11. The solar windshield in accordance with claim 1, wherein each of said first transition lens material, said second transition lens material and said third transition lens material is a photochromic lens material.

12. The solar windshield in accordance with claim 5, wherein each of said first transition lens material, said second transition lens material and said third transition lens material is a photochromic lens material.

13. A vehicle solar windshield system comprising:

(a) a front windshield composed of a first photochromatic lens material having a first darkening strength when exposed to ultraviolet light;

(b) at least one side window composed of a second photochromic lens material having a second darkening strength when exposed to ultraviolet light, said second darkening strength being greater than said first darkening strength, and (c) a rear windshield composed of a third photochromic lens material having a third darkening strength when exposed to ultraviolet light, said third darkening strength being greater than said second darkening strength.

14. The solar windshield in accordance with claim 1, wherein (a) said first photochromic lens material has a darkening strength of about 10 to about 35 percent when exposed to ultraviolet light;

(b) said second photochromic lens material has a darkening strength of about 25 to about 55 percent when exposed to ultraviolet light, and (c) said third photochromic lens material has a darkening strength of about 45 to about 97 percent when exposed to ultraviolet light.

15. The solar windshield system in accordance with claim 2, wherein (a) said first photochromic lens material has a darkening strength of about 20 to about 30 percent when exposed to ultraviolet light;

(b) said second photochromic lens material has a darkening strength of about 35 to about 50 percent when exposed to ultraviolet light, and (c) said third photochromic lens material has a darkening strength of about 65 to about 97 percent when exposed to ultraviolet light.

16. The solar windshield system in accordance with claim 2, wherein (a) said first photochromic lens material has a darkening strength of about 30 percent when exposed to ultraviolet light;

(b) said second photochromic lens material has a darkening strength of about 50 percent when exposed to ultraviolet light, and (c) said third photochromic lens material has a darkening strength of about 97 percent when exposed to ultraviolet light.

17. The vehicle solar windshield system in accordance with claim 13, further comprising a sun/moon roof composed of a fourth photochromic material.

* * * * *